May 12, 1970 R. F. GERISCH 3,511,359
ARTICLE TRANSPORTING SYSTEM
Filed Dec. 4, 1968 6 Sheets-Sheet 5

INVENTOR.
Rudolph F. Gerisch
BY
Hibben, Noyes & Bicknell
Atty's

United States Patent Office 3,511,359
Patented May 12, 1970

3,511,359
ARTICLE TRANSPORTING SYSTEM
Rudolph F. Gerisch, 1317 Portsmouth Ave.,
Westchester, Ill. 60153
Continuation-in-part of application Ser. No. 499,421,
Oct. 21, 1965. This application Dec. 4, 1968, Ser.
No. 781,203
Int. Cl. B65g 21/00, 19/00
U.S. Cl. 198—126        36 Claims

ABSTRACT OF THE DISCLOSURE

A conveyor unit comprising a support rail structure and driven pusher members for pushing hanger hooks or the like along the rail structure is mounted for bodily movement in vertical and/or horizontal directions. The conveyor unit is adapted to cooperate with a plurality of sets of hanger inserter assemblies and hanger release assemblies at various insertion and release stations spaced along the rail structure. These stations may be arranged in one or more stacks or groups of vertically spaced tiers with the conveyor unit movable to any selected position in the system. Several embodiments of conveyor units, inserter assemblies, and release assemblies are described.

---

This application is a continuation-in-part of my copending application Ser. No. 499,421, filed Oct. 21, 1965 and now U.S. Pat. No. 3,415,352, issued Dec. 10, 1968.

In dry cleaning plants, laundries, and clothing manufacturing and retailing plants, it is customary to transport garments (or other articles) on hangers from one location in the plant to another for the purpose of storing or shipping the garments, and numerous conveyor systems have been devised for this purpose. In addition to transporting such articles from one location to another, it is also desirable, in many cases, to have some convenient sorting arrangement so that the articles may be transported and assembled in sorted groups at different locations. In my copending application Ser. No. 499,421, identified above, a novel system is described and claimed which makes it possible to transport articles in any desired sorted relation between a loading point and any number of delivery points while maintaining the predetermined sorted relation of the articles at all times so that there is no possibility of error.

The present invention pertains to certain novel means for inserting articles into and releasing articles from an overhead conveyor system, particularly in combination with a conveyor system which is bodily movable between different locations for cooperation with different groups of inserting and release mechanisms. Although the invention has particular utility in the clothing, dry cleaning and laundry fields, the principles may be employed wherever it is necessary to handle, convey, or store a multiplicity of articles, particularly articles having a hook or suspended from a hook.

Accordingly, one object of the invention is to provide a novel and improved combination of a movable conveyor unit with a plurality of stationary article inserting and release units.

A further object of the invention is to provide a novel and improved means for inserting articles into a conveyor system.

Another object of the invention is to provide a novel and improved means for releasing articles from a conveyor system.

An additional object of the invention is to provide a novel and improved conveyor unit having mounting means permitting bodily movement of the conveyor unit either horizontally or vertically or both.

Still another object of the invention is to provide a novel and improved apparatus of the foregoing character which is especially adapted to handle articles suspended from hooks or hangers.

Other objects and advantages of the invention will become apparent from the following detailed description taken in connection with the accompanying drawings, wherein:

Figure 1:
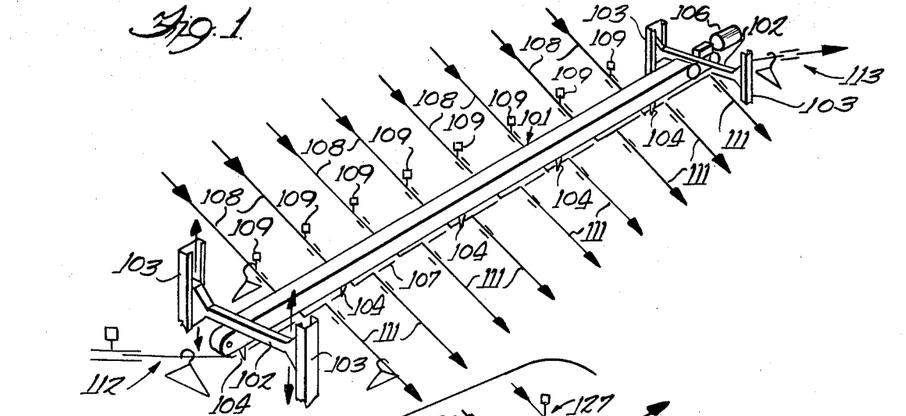
FIGS. 1, 2, 3, and 3A are schematic diagrams illustrating certain broad operating principles of the invention.

FIGS. 1, 2, 3, and 3A illustrate schematically the broad operating characteristics of the system comprising the present invention. For example, FIG. 1 shows an elongated conveyor unit 101 which is rigidly carried at its opposite ends by a pair of vertically movable cross-supports 102. The ends of each of the cross-supports 102 are received in upright channel-shaped standards or columns 103 and are vertically movable therein (by means not shown) for positioning the conveyor unit 101 at any desired elevation, as indicated by the vertical arrows adjacent the columns 103. The conveyor unit 101 is self-contained and comprises an endless pusher mechanism such as a chain trained around sprockets at the opposite ends of the conveyor and provided with outwardly extending pusher forks 104 mounted at spaced intervals along the chain. A motor 106 is mounted on the conveyor frame for driving the chain. An elongated support rail 107 is rigidly mounted below the conveyor chain for receiving and supporting hanger hooks or the like which are pushed along the rail by means of the forks 104.

Cooperating vertically spaced tiers of article transfer stations are provided, each such station comprising hanger inserter mechanisms or hanger release mechanisms for coaction with the conveyor unit 101 in any desired vertical position of the latter. For convenience, only one such tier is shown in FIG. 1, but it will be understood that any desired number of tiers may be used. At each tier the inserters or release mechanisms or both are disposed in spaced relation along the length of hte conveyor unit corresponding to a predetermined arrangement of insertion and removal stations. For example, in FIG. 1 the conveyor unit 101 is shown in position at an uppermost tier having a plurality of hanger insertion stations disposed in horizontally spaced relation along one side of the conveyor unit 101. Each hanger inserter (as described more fully below) comprises a downwardly inclined rail 108 having means 109 for regulating the feeding of the hangers onto the support rail 107 in timed relation to the operation of the conveyor 101. The regulating means 109 may comprise, for example, a device for retaining the hangers in spaced apart relation and feeding them sequentially to the support rail 107, as more fully disclosed in my copending application Ser. No. 673,171, filed Oct. 5, 1967.

At the opposite side of the conveyor unit 101 a plurality of hanger release or removal stations are provided in spaced relation along the length of the conveyor for discharging the hangers from the rail 107 at desired locations along downwardly inclined discharge rails 111. As more fully described hereinafter, the support rail 107 is provided with suitable gaps and rail switches or the like to facilitate insertion and removal of hangers at the various stations.

Although in the particular system illustrated in FIG. 1 the hanger insertion stations are all located at the same side of the conveyor unit 101 and the hanger release stations are all located at the opposite side of the conveyor unit and are interposed between adjacent pairs of insertion stations, it will be appreciated that many different arrangements can be utilized depending upon the requirements of the installation. For example, all or any desired portion of the insertion and release stations can be provided at the same side of the conveyor, and the sequence and spacing of the insertion and release stations along the length of the conveyor can be varied in many different ways to accommodate the demands of the installation. In addition, the illustrated tier of insertion and release stations includes an auxiliary insertion station 112 at one end of the conveyor unit 101 and an auxiliary discharge station 113 at the opposite end of the conveyor unit.

Figures 2, 3, 3A:
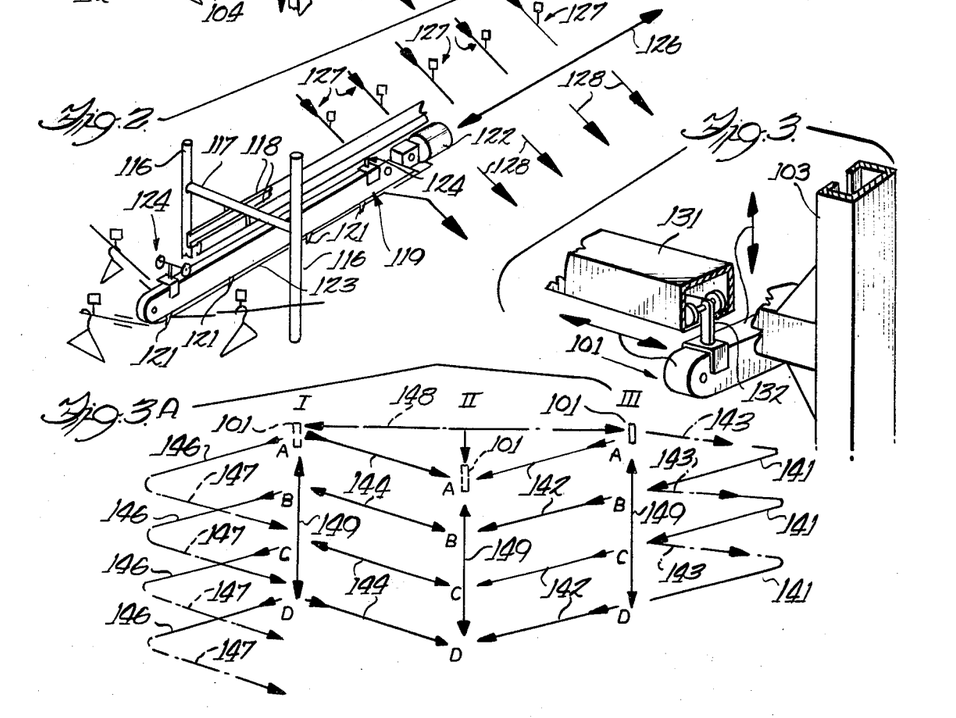

In FIG. 2, a system is shown wherein the conveyor unit is at a fixed vertical location but is mounted for horizontal bodily movement longitudinally of the conveyor. The system framework includes a pair of upright posts 116 with cross-members 117 extending therebetween. A pair of elongated opposed channel members or roller supports 118 are supported from the cross-members 117 and extend for the length of the system. A self-contained conveyor unit 119 is provided which is generally similar to the unit 101 of FIG. 1 and has chain driven pusher forks 121, a drive motor 122, and a support rail 123. The conveyor unit 119 is mounted for horizontal bodily movement longitudinally of the channel members 118 by means of a pair of trolleys or roller assemblies 124 secured to opposite ends of the conveyor frame and arranged for rolling movement in the channel members. The trolleys 124 preferably have a swivel connection with the frame of the conveyor unit 119 so that the support channels 118 can extend in a curved path if desired.

Whereas the conveyor unit 101 of FIG. 1 extends horizontally the full length of the system for coaction with all of the insertion and discharge stations in the uppermost tier, the conveyor unit 119 is relatively short in length so that in any given position it can receive or discharge hangers at only a limited number of insertion and discharge stations. However, since the conveyor unit 119 is movable (either manually or by suitable power operated means, not shown) along the channel members 118, as indicated by the horizontal arrow 126, it will be understood that the conveyor unit can be positioned for coaction with any desired group of insertion and discharge stations along the length of the system, such as the stations designated schematically at 127 and 128, respectively.

FIG. 3 is a fragmentary illustration of a modification of the FIG. 1 system which combines the vertical adjustability of the conveyor unit with horizontal adjustability in a transverse or lateral direction relative to the longitudinal axis of the conveyor unit. Thus, the cross-supports extending between the upright columns 103 are each in the form of a downwardly opening channel member 131 having inturned bottom flanges for rollably supporting trolleys or wheel assemblies 132 which are secured to the ends of the conveyor unit 101. The cross-supports or channel members 131 are provided with end portions receivable in and vertically movable in the columns 103, just as in the case of FIG. 1. Thus, by adjusting the elevation of the conveyor unit 101 any desired tier of insertion and/or discharge stations can be utilized, and by laterally shifting the conveyor unit it can be positioned for cooperation with any one of a plurality of tiered stacks or groups of insertion and/or discharge stations.

FIG. 3A is an end view showing in a schematic manner the operation of one specific embodiment of a conveyor system of the type shown in FIG. 3. In this instance, the system has three laterally spaced stacks or groups of tiers designated by the numerals I, II, and III, and each stack or group has four vertically spaced tiers of insertion and/or discharge stations designated by the letters A, B, C, and D. The conveyor unit 101 is shown in solid lines in position at the uppermost tier A of stack III which, in this case, is the initial receiving stack for the system. In stack III, hangers may be inserted to the conveyor 101 at any of the various tiers by means of a plurality of insertion stations 141 disposed in horizontally spaced relation along each tier, and hangers may be released at any of a plurality of discharge stations 142 also spaced horizontally along each tier. The dashed line portion 143 connecting to each insertion station 141 is intended to indicate that the hangers come to the station from a storage supply.

In this particular illustration, the discharge stations 142 from tiers A to D of stack III communicate with the respective tiers A to D of the center stack II. In stack I, which, in this case, is solely a discharge stack, the hangers can be distributed at any of the tiers A to D either by means of discharge stations 144 communicating with the corresponding tiers of stack II or by means of discharge stations 146 each having a terminal storage or receiving section shown in dashed lines at 147. As will be evident, stack II, in this case, is solely a receiving stack which is supplied from both stacks I and III.

The conveyor 101 can be moved transversely or laterally, as shown by the dashed arrow 148, so as to be shifted to the dotted line positions shown in stacks I and II, and in addition, as shown by the arrows 149, the conveyor unit can be moved vertically up or down in any stack for cooperation with a selected tier of insertion and/or discharge stations. Obviously, a wide variety of combinations is possible, and if desired, more than one conveyor can be utilized in a multiple stack system. Also, such combination systems may utilize conveyors having longitudinal horizontal movability of the type illustrated in FIG. 2 if such is desired.

Structural details will now be described of certain preferred embodiments of the apparatus shown schematically in FIGS. 1 to 3A.

Figures 4, 7, 11:
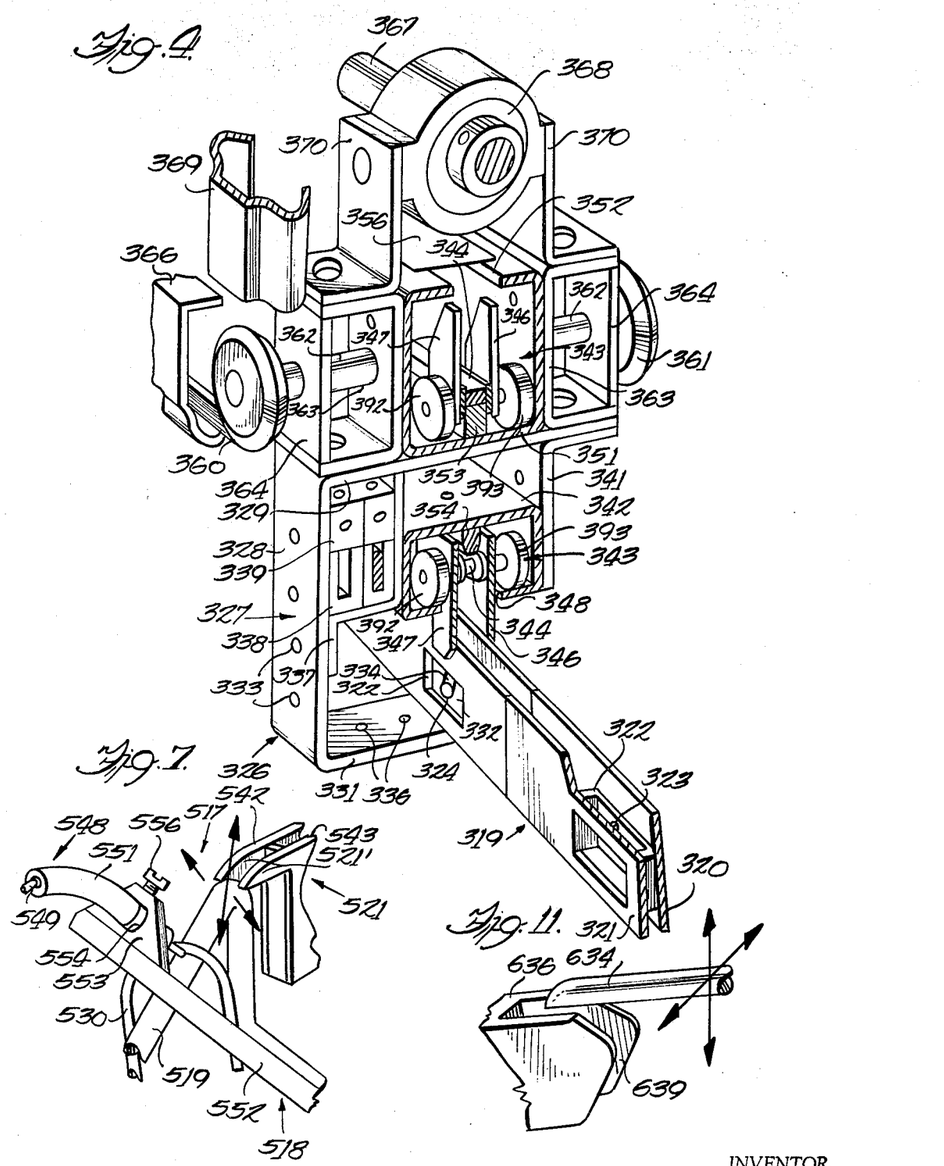
FIG. 4 is a fragmentary perspective view of an adjustable conveyor system comprising one specific embodiment of the invention.
FIG. 7 is a modification of the structure of FIG. 5.
FIG. 11 is a modification of the structure of FIG. 9.

As seen in FIG. 4, the hanger support rail of the conveyor unit, such as the rails 107 and 123 in FIGS. 1 and 2, may comprise a twin rail structure 319 including a pair of spaced rails 320 and 321. The assembled length of the rails 320 and 321 is substantially equal to the length of the section of which it is a part, and the rails are preferably provided in standard lengths. The rails 320 and 321 may be secured together in spaced relation by any suitable means, for example, by forming an indented or offset portion 322 at standard intervals along the rail 321 and forming holes 323 through both the indented portion 322 and the adjacent portion of the rail 320. Bolts 324 are positioned through the holes for securing the rails 320 and 321 together.

The twin rail structure 319 is supported at intervals along its length by means of a plurality of frames 326 (FIG. 4) which are fastened to the rail structure 319 at the indented portions 322. Each frame 326 includes an angle 327 having a "standard" configuration. As will become apparent from the following description, a number of the structural components making up a system are designed such that they may utilize angles having the "standard" configuration of the angle 327 shown in FIG. 4. The standard angle 327 comprises an outer vertical portion 328, an upper horizontal portion 329, a lower horizontal portion 331, and an upturned end portion 332, these portions being integrally formed from a strip of metal bent to the configuration shown. The vertical outer portion 328 has a series of vertically spaced holes 333 formed therethrough which may be used, for example, for receiving bolts when the angle 327 is used to mount hook-inserting or hook-releasing mechanisms, as hereinafter described. The lower horizontal portion 331 is formed at a right angle to the vertical outer portion 328, and the upturned end portion 332 is formed at the end of the lower horizontal portion 331, the portions 328 and 332 being parallel. An elongated slot 334 is provided in the upturned end portion 332, and the rail structure 319 is secured to the angle 327 by inserting the end portion 332 into the pocket of one of the indentations 322 and passing the bolt 324 through the slot 334. The rail 321 is positioned such that the end portion 332 extends between the main body of the rail 321 and the indented portion 322, the portion 322 being offset an amount which is slightly greater than the thickness of the metal strip of the angle 327. The slot 334 is elongated so that the rail structure 319 may be vertically adjusted for the purpose of regulating the position of the rail structure relative to the pusher forks. Holes 336 may also be formed through the lower horizontal portion 331 for the purpose of fastening other components to the angle 327.

Depending upon the width of the rail structure 319 desired, the twin rails 320 and 321 may be fastened together in the manner described wherein the upturned end portion 332 of the angle 327 extends into the indented portion 322, or, if a slightly wider rail structure 319 is desired, the twin rails 320 and 321 may be positioned such that the upturned portion 332 is between the rail 320 and the indented portion 322. On the other hand, if a relatively narrow support rail is desired, two rails having the configuration of the rail 320 may be provided with the upturned portion 332 extending between the two rails, or two rails having the configuration of the rail 320 may be fastened directly together and the upturned portion 332 positioned at the outside surface of one of the two rails. If a very wide rail structure is desired, two rails having the configuration of the rail 321 may be positioned with the indented portions 322 adjacent each other, and the upturned portion 332 may be positioned either within one of the indented portions or between the indented portions of the two rails.

Thus, it can be seen that standardized rail sections having the configurations of the rails 320 and 321 may be connected together in a number of ways to meet numerous different requirements. A relatively wide rail structure is sometimes desirable because it holds the moving hangers in perpendicular planes relative to the rail structure. A thin rail contacts the hanger only at the uppermost section of the hook, and the hanger may pivot about such contact point, whereas a wide rail structure supports a hanger at two laterally spaced points, and such support helps to maintain the hanger perpendicular to the rail structure.

The frame 326 further includes a closure angle 337 which is secured to the angle 327 and is bent to form an enclosed space at the corner of the frame, which is between the vertical portion 328 and the horizontal portion 329. Components such as slide bar supports 338 and flexible cable supports 339, for example, may be positioned in the enclosed space and thereby secured to the frame. At the outer end of the upper horizontal portion 329 is provided an angle 341 which is detachably secured to the portion 329, as by a bolt and nut combination (not shown). The frame 326 also supports a channel 342 which is mounted between the angles 337 and 341 and is secured thereto. The channel 342 has an opening 348 which faces downwardly, and the channel supports the lower section of an endless chain 344 having a series of carriages 343 secured thereto at spaced locations along its length. Each carriage 343 has wheels 392 and 393 rollable along the lower flanges of the channel 342. Each carriage 343 also has forks 346 and 347 secured thereto, which extend downwardly out of the opening 348 and adjacent the vertical outer sides of the rails 320 and 321.

On the upper side of the standard angle 327 is provided apparatus for supporting the return section of the chain 344 and the carriages 343 secured thereto. The latter apparatus comprises a second channel 351 having an opening 352 on the upper side thereof and a guide member 353 of nylon, for example, secured within the channel and at the lower side thereof. The chain 344 rides on the upper surface of the guide member 353. Another guide member 354, similar to the member 353, is secured within the lower channel 342 at the upper side thereof. The guide member 354 is positioned above the chain 344 and its lower surface is at a level such that the pins or rollers of the chain 344 are normally spaced a short distance below the lower surface of the guide member 354 so as to prevent excessive rise of the carriages as they push hangers and also to prevent tilting movement of the carriages. The upper guide member 353, on the other hand, supports the upper or return section of the chain and the carriages attached thereto. To prevent dust and dirt from entering the interior of the channel 351 through the opening 352, a strip of tape 356 covering the opening 352 may be provided.

Vertical or horizontal movability of the conveyor unit shown in FIG. 4 may be provided in a manner somewhat different from the arrangements shown in FIGS. 1 to 3A. Thus, rollers 360 and 361 may be provided at the vertical sides of each frame 326, each roller 360 and 361 being rotatably mounted on a shaft 362 which in turn is supported by U-shaped angles 363 and plates 364 secured to the opposite sides of the channel 351. The shafts 362 are arranged to support the rollers 360 and 361 for rotation about a common horizontal axis which is perpendicular to the rails 320 and 321. For horizontal movement of the system, a longitudinally extending channel 366 is provided at each side of the frame 326 (only one being shown in FIG. 4), and the channels 366 receive the rollers 360 and 361 in supporting relation. The channels 366, of course, may be rigidly secured to the supporting frame of the building. The rollers 360 and 361 are designed to ride longitudinally along the lower sides of the channels 366 when the system is moved in a horizontal plane. To obtain vertical movement of the system, a vertical channel 369 may be provided at each side of the frame 326 (only one being shown in FIG. 4), the channels 369 being rigidly secured to the building and being designed to receive the rollers 360 and 361 for guiding their movement in a vertical plane. The horizontal channels 366 may be arranged in vertically spaced pairs and the vertical channels 369 may be arranged in horizontally spaced pairs so that the conveying and sorting system can be moved to various locations for servicing a plurality of tiers of incoming or outgoing stations, as heretofore described. Suitable power means (not shown) must, of course, be provided for lifting or lowering the system to the desired set of channels 366 and moving the system horizontally along the channels 366.

A power shaft 367 for operating auxiliary conveyors extending laterally from the main conveyor, as described in the parent application Ser. No. 499,421, may have a bearing 368 supported on the frame 326 by means of a pair of angles 370 mounted on the angles 363.

Figures 5, 6, 8:
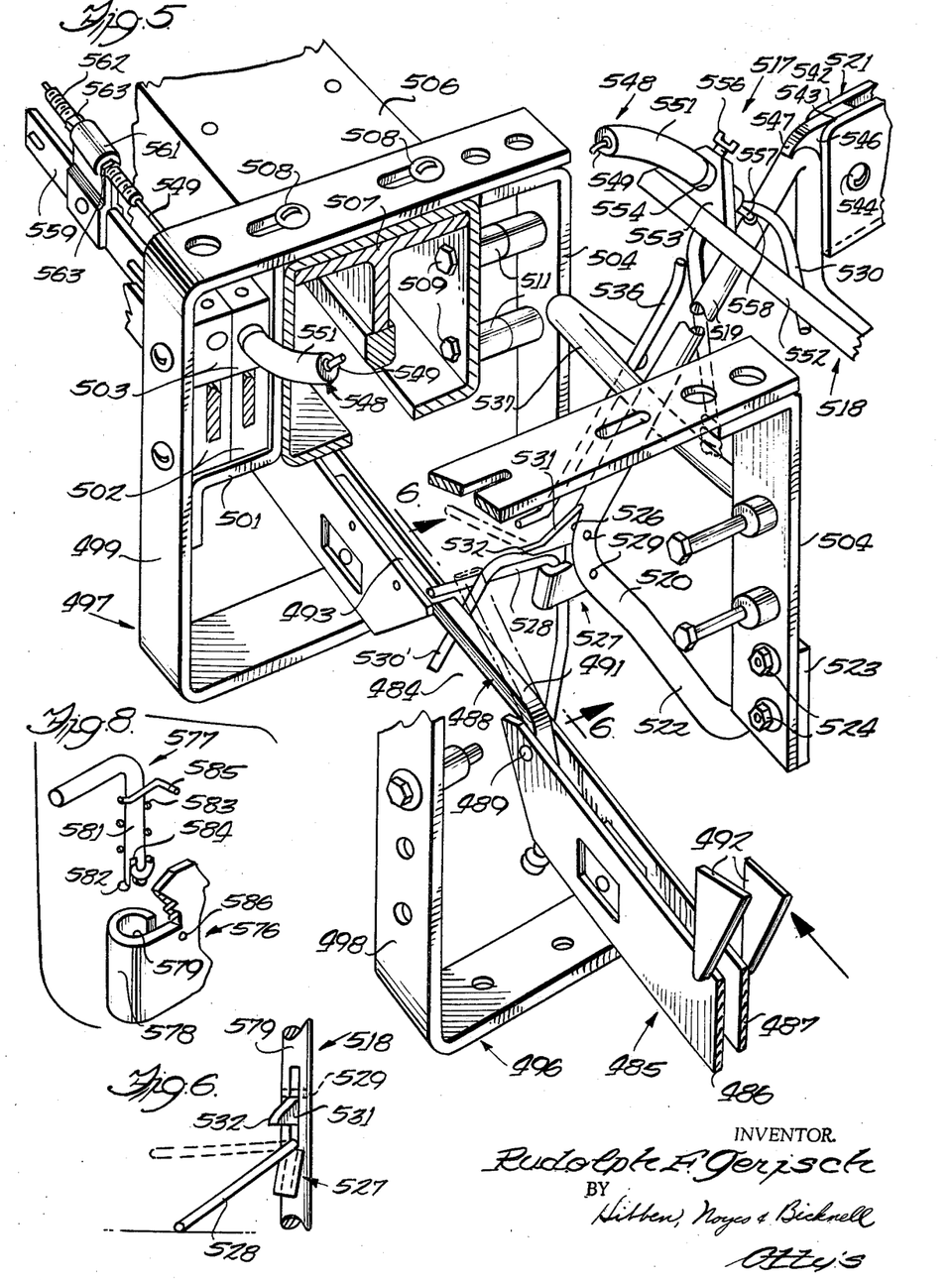
FIG. 5 is a fragmentary perspective view of one embodiment of a hanger or hook inserter assembly for use with a conveyor system.
FIG. 6 is an elevational view as seen along the line 6—6 of FIG. 5.
FIG. 8 is a further modification of the structure of FIG. 5.

In FIGS. 5 and 6 is shown an apparatus for inserting a hanger on a track or rail structure. Such apparatus may be used, for example, at the insertion stations 108, 127, or 141 in FIGS. 1 to 3A.

The rail structure designated at 485 includes two parallel rails 486 and 487. A gap or switch opening 484 is formed in the rail structure 485, the switch opening being bridged by a bridging arm 488. The arm 488 may comprise an elongated strip of metal which is bent at, for example, approximately 45°, and the arm 488 is pivotally mounted by means of a pin 489 on the twin rail structure 485 at the upstream side of the opening 484. Instead of a pivotally mounted arm for bridging the rail gap 484, it would also be possible to use an arm comprising, in whole or in part, a strip of spring steel normally urging the arm to closed or open position and resiliently deflectable to the opposite position for inserting a hanger or allowing a hanger to traverse the gap. The arm 488 extends between the two rails 486 and 487 and has a bridging portion 491 which is long enough to bridge the opening 484 in the rail structure 485. In the embodiment illustrated in FIGS. 5 and 6, the arm 488 is freely pivotable about the pin 489 and its weight distribution is such that the arm is normally held by gravity in the full line bridging position shown in FIG. 5. However, spring means may also be provided for this purpose. When a hanger is being pushed along the structure 485 toward the left as seen in FIG. 5, which is the downstream direction, pusher forks 492 push the hanger onto the bridging portion 491 so that the hanger will cross the opening in the rail structure without falling through. When the portion 491 is in the horizontal position as shown in FIG. 5, its downstream end rests on a stop 493 positioned between the rails 486 and 487 at the downstream side of the opening 484. As hereinafter described, the downstream end of the arm portion 491 is liftable from the stop 493 to the dashed line position shown in FIG. 5 by the action of a hook being inserted onto the rail structure 485 at the gap 484. The fact that the arm 488 is normally in bridging position across the gap 484 makes it possible to provide for reverse travel of the pusher forks 492. However, it is also possible to provide spring means or the like for normally urging the arm 488 to its raised or open position in which case the hook itself being pushed along the rail structure 485 by the fork 492 causes temporary closing of the arm and bridging of the gap 484.

The rail structure 485 is supported by standard frames of the type previously described. Two frames are shown in FIG. 5, a rearward frame 496 and a forward frame 497, and the rail structure opening 484 is located substantially midway between the two frames 496 and 497. The frames include standard angles 498 and 499, respectively, these angles having upturned ends which are positioned between the rails 486 and 487 and secured thereto in the manner previously described. The frames 496 and 497 further include a closure angle such as the closure angle 501 for the frame 497 shown in FIG. 5. Enclosed between the closure angle 501 and the standard angle 499 are a plurality of slide bar supports 502 and flexible wire supports 503. Further supported by the standard angles 498 and 499 of the frames are angle members 504 which are secured to the outer ends of the standard angles 498 and 499 and extend downwardly from these outer ends. The frames 496 and 497 are designed to support a channel 506 and a T-shaped guide bar 507 which supports a guide and an endless chain (not shown) having forks secured thereto as previously explained. The channel 506 may be secured to the standard angle 499 by means of bolts 508, and additional bolts 509 and spacers 511 may be provided between the channel 506 and the angle members 504 for the purpose of securing the angle members 504 to the channel 506.

A hook inserter assembly 517 is supported by the frame 496 and is designed to insert hooks from the right of the support rail, when looking in the downstream direction. The hook inserter assembly 517 comprises a generally cylindrical rod 518 having an inclined central portion 519 which extends downwardly from a hook support storage rail 521 to approximately the bridging arm 488. The slope of the inclined portion 519 is such that a hanger positioned on the upper end of the inclined portion tends to slide downwardly by gravity. An angle of inclination of 15° to 20° normally is sufficient for this purpose. The inclined portion 519 is preferably in a plane which is perpendicular to the axis of the rail structure 485. From its upper end, the inclined portion 519 slopes downwardly toward the rails 486 and 487 and at its lower end curves downwardly and away from the rails 486 and 487 to form another portion 520. At the lower end of the portion 520, the rod member 518 is bent in the upstream direction to form a horizontal mounting portion 522 which is generally parallel to the rails 486 and 487 and extends from the lower end of the portion 520 to the lower end of the angle member 504 of the frame 496. The end of the horizontal portion 522 adjacent the angle 504 is secured, as by welding, to a plate 523 which in turn is secured by means of bolts 524 to the angle member 504. The angle member 504 thus supports the rod 518. During the operation of the inserter assembly, hangers slide down the inclined portion 519, and the purpose of the portion 520 is to offset the horizontal mounting portion 522 sufficiently far from the lower end of the inclined portion 519 to permit the open side of the hook to slide off of the lower end of the inclined portion 519 without interference.

At the juncture of the two portions 519 and 520, a generally vertical slot 526 is formed in the side of the rod 518 which is adjacent the rail structure 485, and a support 527 for a pivotal arm 528 is secured to the rod 518 by pins 529. The support 527 may be made from flat stock which is positioned edgewise in the slot 526, and the pivotal arm 528 may be made, for example, from round heavy wire stock. One end of the arm 528 is turned down and is positioned within a hinge or bearing formed on the support 527, as by bending or curling a portion of the support around an end of the arm 528. From the support 527, the arm 528 extends downwardly at an angle toward the rails and its lower end rests between the two rails 486 and 487 on the stop 493, preferably at a location just downstream from the downstream end of the bridging arm 488. While the lower end of the pivotal arm 528 normally rests on the stop 493, the pivotal connection between the arm 528 and the support 527 permits the arm 528 to swing upwardly to the position shown in dashed lines in FIG. 5, which occurs when a hanger is being pushed over the bridging arm 488. In such circumstances, the hanger pushes the pivotal arm 528 upwardly and off to the side to the dashed line position as it passes, after which the pivotal arm 528 swings downwardly and again rests on the stop 493 due to the force of gravity. To obtain the pivotal movement of the arm 528 as described, the downturned pivot portion of the arm 528 and the bearing portion of the support 527 are at an inclined angle relative to a vertical plane, as shown in FIG. 6, so as to provide an inclined pivot axis for the arm 528. The inclined pivot axis extends generally upwardly and rearwardly with respect to the direction of movement along the rail structure so that the pivotal arm 528 is normally urged to closed position against the stop 493.

Although the pivotal switch arm 528 in FIG. 5 is shown as seating on the rail structure 485, it will be understood that an integral stop portion can be provided on the support 527 for coaction with the arm 528 to limit the downward position of the latter without reliance on seating engagement with the rail structure. Reference is made to my prior U.S. Pat. No. 3,124,236 for a more detailed showing of such an arrangement.

To provide a smooth transition of a hanger from the portion 519 of the rod 518 to the pivotal arm 528, the upper edge portion of the support 527 extends outwardly from the slot 526 toward the rail structure and overlies the uppermost end of the arm 528, as at 531. The tip 532 of the extension 531 is further bent in the downstream direction at substantially the same angle as the angle of the pivotal arm 528 when the latter is in its normal position on the stop 493. Thus, a hanger sliding down the inclined rod portion 519 will slide onto the extension 531 of the support 527, onto the tip 532, and thence to the pivotal arm 528 from which it will slide onto the rails 486 and 487 just forward of opening 484 in the rail structure. As previously described, the bridging arm 488 is normally pivoted to the full line bridging position shown in FIG. 5, but the bent tip 532 and the angularly extending arm 528 cause the hanger hook to twist in a downstream direction as the hanger slides toward the rail structure 485 and the forward end portion of the hook engages the underside of the arm portion 491 and lifts the latter sufficiently to allow the hook to slide freely onto the rail at the downstream side of the gap 484.

The open side of a hanger hook traveling along the rail structure 485 should be toward the left when looking downstream in FIG. 5, and a hanger sliding down the portion 519 of the rod 518 should have the open side of the hook facing upstream as illustrated by the hook 530 in FIG. 5. As the hanger 530 slides through the inserter assembly, it twists or rotates as it moves over the support 531–532 and the arm 528 to bring the open side of the hook to the left of the rail structure when viewed in the downstream direction, as illustrated by hook 530′ in FIG. 5.

If desired, a slanted hook control rail 536 may be mounted closely adjacent the inclined portion 519 of the rod 518. The rail 536 may be formed of relatively heavy wire stock and is held in place by a support arm 537 which extends rigidly from the angle member 504 to a position relatively close to the rod portion 519. The rail 536 extends generally parallel to the rod portion 519 and is located slightly above and to the left of the portion 519 as viewed in FIG. 5. The lower end of the rail 536 may be bent at substantially the same angle as the tip 532 of the support 527 and terminates closely adjacent the lower end of the tip 532. The rail 536 being laterally displaced to the left of the slide rail 519 insures angular twisting or rotation of the hanger hooks so that a hook 530′ arriving at the gap 484 is oriented in edgewise fashion thereby providing more effective lifting engagement with the arm portion 491 and minimizing the required size of the gap 484 for insertion of hooks onto the rail structure.

The storage rail 521 at the upper end of the inclined portion 519 of the rod 518 preferably comprises a pair of rails 542 and 543 similar to the rails 486 and 487. An extension rail plate 546 having a forwardly projecting tip 547 is mounted at the end of the storage rail 521 between the rail members 542 and 543 and is secured thereto by a screw 544. The tip 547 extends over the upper end of the inclined portion 519 of the rod 518 to provide a smooth transition for hangers moving from the storage rail 521 to the portion 519 of the rod 518.

To selectively inject hangers on the support rail structure 485, means may be provided including a flexible cable, such as a Bowden wire 548. The Bowden wire 548 includes a movable wire 549 and a sheath 551, the sheath 551 being held stationary relative to the portion 519 of the rod 518 by means of a bracket 553 on a support portion 552 of the rod 518. From the upper end of the portion 519 of the rod 518, the rod 518 is bent to extend substantially vertically downwardly, then upstream from the portion 519, and then upwardly over the top of the portion 519 to form the support portion 552. The bracket 553 is secured, as by welding, to the portion 552 above the portion 519, and the sheath 551 of the Bowden wire 548 is positioned through a hole 554 formed through the bracket 553 and secured to the bracket 553, as by a set screw 556. The wire 549 terminates in a release point 557 which, when in an unactuated position, extends into a slight dimple or depression 558 formed in the upper surface of the inclined rod portion 519 adjacent the upper end thereof. Thus, a hanger moving off of the plate 546 onto the upper end of the inclined portion 519 of the rod 518 will slide downwardly along the portion 519 until it meets the release point 457, and the hanger will be held by this point until the release point 557 is retracted sufficiently to permit the hanger to slide downwardly along the portion 519 and onto the rail structure 485.

To actuate the release point 557, the Bowden wire 548 is mounted in one of the flexible cable supports 503. The sheath 551 of the assembly 448 is secured to the support 503, while the wire 549 extends therethrough and is connected to a slide bar 559 which is slidably received in a support 502. The wire 549 is connected to the slide bar 559 by means of a screw 462 affixed to the wire 549 and projecting through an upright bracket 561 mounted on the slide bar 559. A pair of nuts 563 are threaded on the screw 562 for adjustably retaining the latter on the bracket 561. The connection between the wire 549 and the bracket 561 is such that the screw and nut arrangement may be tightened after the wire 549 is in the proper adjusted position relative to the rod 518 and the slide bar 559. Actuation of the slide bar 559 and the wire 549 to release a hanger on the portion 519 of the rod 518 may be accomplished by any suitable means such as the trip mechanism described in the parent application Ser. No. 499,421.

To permit insertion of hooks onto the rail structure 485 with the open sides of the hooks facing to the left instead of to the right as shown by hook 530 in FIG. 5, another inserter assembly may be provided adjacent the inserter 517, but in this case the pivotal arm corresponding to the arm 528 is inclined in an upstream direction and the rail switch corresponding to arm 488 is pivoted at the downstream side of the rail gap. Thus, when the hook is inserted onto the rail structure 485 it is moving in an upstream direction but its direction of travel is then reversed upon engagement by the pusher fork 492. With such a dual inserter arrangement, hangers can be inserted onto the rail structure with the open sides of the hooks facing in either direction and with the pusher fork 492 moving in either direction.

In operation, movement of the forks 492 in the downstream direction in FIG. 5 causes hangers to be pushed along the structure 485 in the downstream direction. The bridging arm 488 is normally pivoted downwardly to the full line position shown in FIG. 5, and the forks 492 are thus able to push the hangers across the opening 484. The pivotal arm 528 of the hook inserter assembly is normally in the solid line position shown in FIG. 5 wherein the lower end rests on the stop 493. However, the hook of a hanger being pushed by the forks 492 engages the arm 528 pushing it upwardly to the dashed line position of FIG. 5. After the hanger has passed, the arm 528 swings downwardly to the stop 493.

When a hook is to be inserted on the rail structure 485 by the hook inserter assembly 517, the Bowden wire 548 is actuated, as previously explained, causing the release point 557 to retract. A hanger positioned on the portion 519 of the rod 518 and previously being held by the release point 557 then slides downwardly along the length of the portion 519 and onto the extension 431, the control rail 536 causing twisting of the hook. The hanger then slides off the tip 532 of the extension 531 onto the pivotal arm 528, and the forward end of the hook lifts the bridging arm 488 to the upwardly pivoted position of FIG. 5 to permit the hanger to slide onto the rail structure 485 downstream from the gap 484. The hanger then rests on the rail structure 485 at this position until the next set of forks 492 moves along the rails 486 and 487 and engages the hanger, thereby continuing the movement of the hanger along the rail structure 485.

Of course, actuation of the Bowden wire 548 must be coordinated with the positions of the pusher forks 492 so that a hanger will not be released at the same time that a pair of forks 492 is passing over the bridging arm 488 adjacent the hook inserter assembly 517. Such coordination or timed operation can be accomplished in different ways, e.g. by effecting actuation of the Bowden wire 548 in response to movement of a fork past a suitable trip mechanism as explained more fully in the parent application Ser. No. 499,421. It will be understood that the inserter 517 may be operated to feed more than one hanger at a time onto the rail structure 485 if desired.

As illustrated in FIG. 5, the inserter assembly 517, the storage rail 521, and the conveyor system including the rail structure 485 are all in fixed relationship. However, it will be recalled that the structure shown in FIG. 4 includes rollers and channels for vertically or horizontally moving the conveyor system. In such an adjustable system having the hook inserter assembly 517 shown in FIG. 5, the rod 518 may be arranged to move vertically or horizontally with the rail structure 485 and the frame 496, while the rail 521 may be stationary. As shown in FIG. 7, the conveyor system would be positioned such that the upper end of the portion 519 is closely adjacent the storage rail 521 but is not connected to it. The extension plates 546–547 of FIG. 5 is omitted but the storage rail 521 has spaced extensions 521' which are far enough apart to receive the rod portion 519 in vertically adjustable relation, thereby allowing the conveyor system to service any one of a plurality of storage or feed rails 521 arranged in varying horizontal and vertical positions.

The construction could also be such that the rod 518 is stationary and supported by the rail 521, in which case the plate 523 and the portion of the rod 518 attached to plate 523 would be eliminated. The rod 518 would thus terminate just below the lower end of the portion 519. In the latter construction, it would be desirable to have the pivotal arm 528 normally in a raised position away from the rail structure 485 to permit movement of the rail structure without interference by the arm 528.

In FIG. 8 is shown a construction wherein such a pivotal arm is normally held upwardly away from the rail structure. The structure shown in FIG. 8 comprises a support bracket 576, which is generally similar to the support 527 shown in FIG. 5, and a pivotal arm 577, which is generally similar to the arm 528. A hinge 578 for the arm 577 is formed on the bracket 576 by bending or curling an edge of the bracket 576, the opening 579 formed by such bending being generally vertical and sufficiently large to receive a bearing portion 581 of the arm 577. The lower end of the portion 581 has a bead 582 which may serve to retain a coiled torsion spring 583 on the bearing portion 581 and to retain the portion 581 within the opening 579. One end of the torsion spring 583 is positioned in a slot 584 formed in the lower end of the portion 581, and the upper end of the spring 583 is bent at a right angle, as at 585, and positioned through an opening 586 formed through the support 576.

From the bearing portion 581, the arm 577 is bent at a substantially right angle, as previously explained, and extends over the upper edge of the portion 578 of the support 576. The upper edge of the portion 578 thus acts as a support for the arm 577, and the spring 583 is tensioned to urge the arm 577 to the position where the forward end of the arm 577 is pivoted upwardly away from the rail structure. When a hanger slides down the portion 519 of the rod 518 and onto the arm 577, the weight of the hanger is sufficient, relative to the strength of the spring 583, to pivot the arm 577 against the force of the spring 583 to the position where the forward end of the arm 577 rests on the stop 493 and the hanger then slides onto the rail structure.

A spring loaded normally open switch such as shown in FIG. 8 is also required to accommodate reverse operation of the conveyor, i.e. movement of the forks 492 in the opposite direction from that shown in FIG. 7. The switch of FIG. 8 is also useful when it is desired to have a pair of inserter assemblies at opposite sides of the rail structure and both feeding into the same gap in the rail structure. Thus, hooks can be fed alternately from either inserter and the pivotal switch arm of the inserter closes only when a hook traverses the same.

Other types of hook inserters could be used with the present system. For example, a gravity inserter could be disposed in elevated position sufficiently above the rail structure 485 so that the hooks can drop onto the rail without the necessity of a gap in the rail structure. However, the use of a gap and a pivotal rail switch, as herein described, permits hooks to be inserted with the open portions of the hooks facing in either direction. In addition, the presently described arrangement allows compact positioning of the structures and minimizes the required length of the pusher forks.

Figures 9, 10:
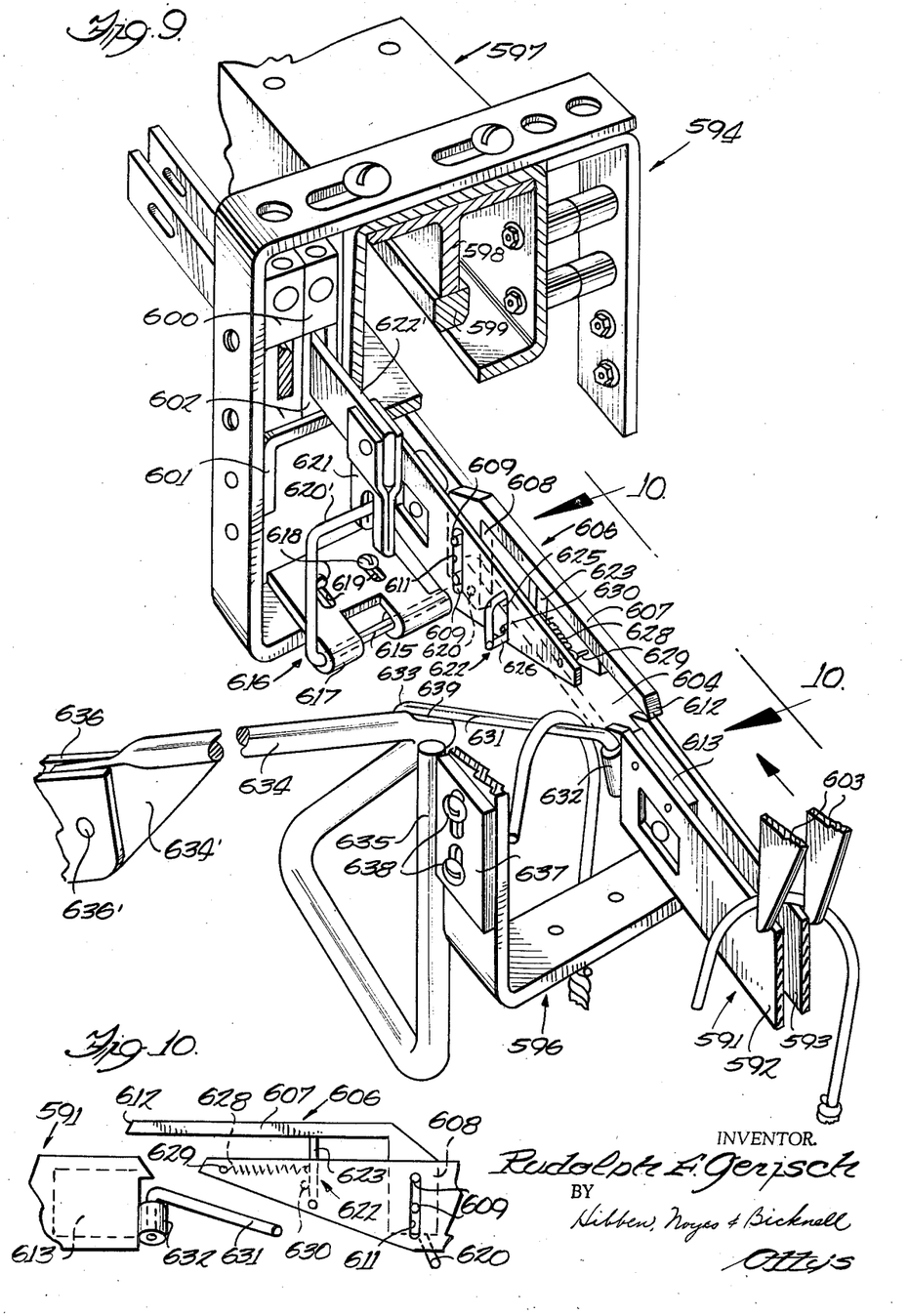
FIG. 9 is a fragmentary perspective view of one embodiment of a hanger or hook release assembly for use with a conveyor system.
FIG. 10 is an elevational view, on a reduced scale, as seen along the line 10—10 of FIG. 9.

FIGS. 9 and 10 illustrate a hook release or drop off assembly for removing hangers from a rail structure. The assembly includes a rail structure 591 comprising two rails 592 and 593 of the type previously described and two frames 594 and 596 for supporting the rail structure 591, also as previously described. The frames further support a channel 597, a T-shaped bar 598 with an attached guide 599, a closure angle 601, slide bar supports 602, and flexible cable supports 600. The channel 597 supports an endless chain having carriage forks secured thereto, a portion of a pair of forks 603 being shown in FIG. 9.

The rail structure 591 is in two sections which are separated by an opening or gap, indicated generally by the numeral 604. The gap 604 is normally bridged by a vertically movable bridging arm 606 which has a longitudinally extending bridging portion 607 and a vertical support portion 608, the latter portion being mounted on the portion of the rail structure 591 which is on the downstream side of the gap 604.

The bridging arm 606 is mounted on the rail structure 591 by means of a pair of laterally extending vertically spaced pins 609 which are secured to the portion 608 and extend into a vertically elongated slot 611 formed in the rail 592. The length of the slot 611 is such that when the lowermost of the pins 609 is resting on the lower edge of the slot 611, the portion 607 of the bridging arm 606 is substantially level with the upper edges of the rail structure 591 and the upstream end 612 of the portion 607 rests on a stop block 613 disposed between the rails 592 and 593 at the upstream side of the gap 604. On the other hand, when the uppermost of the two pins 609 is substantially at the upper edge of the slot 611 (as shown in FIGS. 9 and 10), the portion 607 of the bridging arm is raised upwardly from the stop block 613 so that a hanger may move between the under side of the portion 607 and the upper edge of the rail structure 591 and drop through the opening 604.

The bridging arm 606 may be moved to the raised or actuated position by means of a lift arm 616 having a portion 615 which is pivotally mounted on a hinge 617, the hinge 617 in turn being mounted on a standard angle of the frame 594. The hinge 617 is secured to the standard angle by screws 618 which are positioned through longitudinally elongated slots 619 formed in the hinge 617. By making the slots 619 elongated, the position of the hinge 617 may be adjusted longitudinally on the frame 594 in order to properly position the parts. The pivot axis of the lift arm portion 615 extends laterally of the rail structure 591 adjacent the downstream end of the bridging arm 606. Underneath the portion 608 of the arm 606, the lift arm portion 615 is bent upwardly and extends between the rails 592 and 593, as at 620, to engage the under side of portion 608 of the bridging arm 606. The other end of the life arm 616 is bent upwardly and inwardly, as at 620', and is loosely engaged by a depending forked member 621. The member 621 is fastened to a slide bar 622' which is slidably mounted in one of the slide bar supports 602, and the two legs of the forked member 621 extend on opposite sides of the lift arm portion 620'. When the slide bar 622' and the forked member 621 are moved in the upstream direction relative to the frame 594 and the hinge 617, the upturned end portion 620 of the lift arm 616 swings in an arc in the upstream direction and downwardly, similar to the arcuate movement of the lift arm portion 620' which is engaged by the forked member 621. On the other hand, when the slide bar 622' is moved in the downstream direction, both ends of the lift arm 616 are swung upwardly and the bridging arm 606 is lifted upwardly, as shown in FIGS. 9 and 10.

The slide bar 622' may be actuated by a solenoid or by a mechanical trip mechanism of the type shown in my parent application Ser. No. 499,421. In the event the type of trip mechanism employed does not include a delay mechanism designed to hold the bridging arm 606 in the upward or actuated position, sufficiently long for a hanger to fall through the opening 604, such a delay may be obtained by means of a pivotally mounted forked member 622. One arm 623 of the forked member 622 extends between the two rails 592 and 593 underneath the portion 607 of the bridging arm 606, and the other arm 625 of the member 622 is positioned on the outside of the rail structure. In the construction shown, the arm 625 is positioned adjacent the outside vertical surface of the rail 592. Both arms 623 and 625 are secured to a pin 626 which in turn is pivotally mounted on a laterally extending axis on the rail structure. The forked member 622 is normally urged by a spring 628 to an upright position as determined by a stop pin 630 projecting rigidly from the rail 592. One end of the spring 628 is connected to the arm 623 at a location which is offset from the pin 626, and the other end of the spring 628 is fastened to a laterally extending pin 629 which is secured to the rails 592 and 593 upstream from the forked member 622. The spring 628 is relatively weak, and the weight of the bridging arm 606 is normally sufficient to hold the forked member 622 in a lower or unactuated position where the arms 623 and 625 extend generally horizontally. However, when the bridging arm 606 is raised, the spring 628 swings the arms 623 and 625 upwardly, and the arm 623 which is positioned between the two rails 592 and 593 extends upwardly underneath the bridging portion 607 and holds the bridging arm 606 in the raised position. Since the arms 623 and 625 are substantially vertical when in the actuated position, relatively little force is required to hold the arms 623 and 625 in this position. After a hanger has been pushed through the opening 604 by the forks 603, the bridging arm 606 being in the actuated or upward position, it will be understood that continued movement of the forks 603 past the opening 604 causes the fork 603 which is on the left when looking in the downstream direction (as in FIG. 9) to engage the arm 625 of the forked member 622 and swing the upper end of the arm 625 forwardly. Once the arms 625 and 623 are offset slightly from a vertical plane, the weight of the bridging arm 606 is sufficient to swing the arms 623 and 625 further downwardly and the bridging member 606 returns to the lower or unactuated position.

Thus, the forked member 622 serves as a delayed opening device since it holds the bridging arm 606 in the upward position, wherein the gap 604 is open to permit a hanger to drop through, until the pusher forks 603 pass by the bridging member 606. Therefore, the bridging member 606 may be raised or actuated well ahead of the arrival of the hanger and the forks 603, and the bridging member 606 will remain in the actuated position until the hanger has fallen through the opening.

When a hanger is pushed through the opening 604, assuming that the bridging member 606 is in the actuated position, it drops onto a takeoff arm 631 which is pivotally mounted on the rail structure 591 between the rails 592 and 593 at the upstream side of the opening 604. The stop 613 has a hinge portion 632 formed thereon, as by bending or curling the downstream end portion of the stop 613 around an end of the arm 631, and the arm 631 is bent downwardly from the upper edge of the hinge portion 632 at, for example, a 15° angle from the horizontal. Furthermore, the hinge portion 632 is constructed such that the pivotal axis of the arm 631 is tilted somewhat from a vertical line, the tilt in the construction shown in FIG. 9 being toward the left when looking in the downstream direction from the rail structure 591. The tilt of the hinge axis causes the takeoff arm 631 to be normally drawn by the force of gravity to the position shown in full lines in FIG. 9 wherein its outermost end 633 is offset to the left of the rail structure 591 and engages a rod 634. From the end 633 of the arm 631 the rod 634 extends downwardly at, for example, a 10° to 15° angle, to a rail extension 636 which may be used for temporary storage of garments being carried by the hangers. The rail extension 636 has a bifurcated end portion which receives a web portion 634' on the rod 634, and a pin 636' provides a fixed connection therebetween. The rod 634 is supported by the frame 596, the rod having multiple bends and a terminal portion 635 secured to a fastening plate 637 which in turn is secured, as by screws 638, to the frame 596.

The portion of the rod 634 which is engaged by the end 633 of the takeoff arm 631 may be indented or grooved, as at 639, so that the end 633 of the arm 631 is recessed somewhat into the rod 634 to provide a smooth transition of a hanger from the arm 631 to the rail 634. However, instead of seating engagement of the arm 631 with the rod 634, a pivot stop may be provided on the hinge portion 632 to limit the position of the arm 631 in the manner disclosed in my prior U.S. Pat. No. 3,124,236. Furthermore, the inclined pivot axis of the arm 631 permits the arm 631 to be pivoted to a position in which it extends substantially longitudinally of the rail structure 591, such pivotal movement being effected by the forks 603 as they pass the gap 604.

In operation, as a hanger is pushed toward the opening 604, the slide bar 622' is actuated by suitable automatic means (e.g. by a trip mechanism engaged by the fork 603, as shown in the parent application Ser. No. 499,421) when the fork 603 is a short distance upstream from the opening 604. Downstream movement of the slide bar 622' causes swinging movement of the lift arm 616. Movement of the lift arm 616 causes upward movement of the bridging member 606 due to the engagement of the underside of the portion 608 by the inner end 620 of the arm 161, and when the bridging member 606 reaches the raised or actuated position, the spring 628 swings the forked member 622 to its upright position with the arm 623 extending generally vertically underneath the portion 607 and holding the bridging member 606 in the raised position. Subsequent deactuation of the slide bar 622' permits the lift arm 616 to return to the unactuated position, but the bridging member 606 remains in the raised position due to the action of the forked member 622. Thereafter, continued downstream movement of the forks 603 causes the hanger being moved by the forks to be pushed through the opening 604 where the hook drops onto the bridging arm 631. Due to the downward slope of the arm 631, the hook slides rapidly along the length of the arm 631, off the forward tip 633 of the arm and onto the rod 634 and rail 636. As the fork arms 603 pass over the opening 604, the left-hand fork arm 603 engages the takeoff arm 631 and swings it forwardly to the position shown in dotted lines in FIG. 9, but by then the hanger is already off the arm 631 and, therefore, there is no interference with the hanger. Still further downstream movement of the fork 603 causes the fork arm which is on the left when looking in the downstream direction to engage the arm 625 and swing the arm 625 in the downstream direction, such movement permitting the bridging member 606 to fall to the lower or unactuated position. Subsequent pusher forks 603, moving other hangers which have as their destination other removal stations, move over the bridging member 606 which is now in lowered or unactuated position. To accommodate reverse operation of the conveyor system, the bridging arm 631 may be spring loaded for normally holding it in the dotted line position, in the manner heretofore explained in connection with FIG. 8.

As illustrated in FIG. 9, the hanger release or drop-off assembly has a fixed connection between the rail structure 591 of the conveyor system and the storage rail extension 636. However, in order to accommodate vertical and/or horizontal adjustability of the conveyor system, as heretofore described, the hanger release assembly may be modified as shown in FIG. 11. The pin 636' and the web portion 634' of FIG. 9 are omitted and the bifurcated opening 639 in the rail 636 is wide enough to receive the free end of the rod 634 in vertically adjustable relation as indicated by the arrow.

Figure 12:
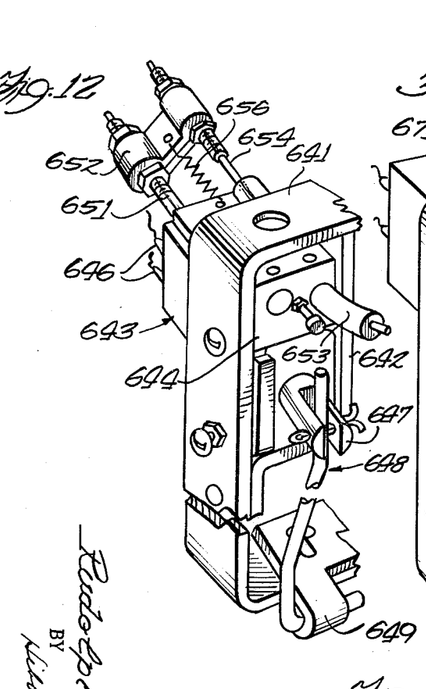
FIG. 12 is a fragmentary perspective view of an actuating means for use with the assembly of FIG. 9.

In FIG. 12 is shown an apparatus for actuating a bridging member, such as the member 606 shown in FIG. 9, and at the same time actuating, for example, a hook inserter assembly. The structure shown in FIG. 12 comprises a frame having a standard angle 641 and a closure angle 642, which are identical with the corresponding members of the frames previously described. Between the closure angle 642 and the adjacent corner of the standard angle 641 are mounted a solenoid 643 and a flexible cable support 644. The solenoid 643 includes electrical conductors 646 for connection with a power supply and a solenoid plunger 647 which is designed to move substantially in the longitudinal direction upon energization of the winding of the solenoid 643. Loosely connected to the upstream end of the plunger 647 is a lift arm 648 which is pivotally mounted on a hinge 649 affixed to the angle 641, the members 648 and 649 corresponding to the lift arm 616 and the hinge 617 shown in FIG. 9. Upon energization of the solenoid 643, the plunger 647 moves in the downstream direction and swings the lift arm 648 in order to raise a bridging member (not shown) at a hook release station, as described with regard to FIGS. 9 and 10.

The solenoid plunger 647 further includes an extension 651 which extends downstream from the frame and has adjustably connected thereto a bracket 652. The cable support 644 has mounted thereon a cable including a sheath 653 which is secured to the support 644 and a flexible wire 654 which extends through the sheath 653 and is adjustably connected to the bracket 652 in the same general manner heretofore described in connection with FIG. 5. Thus, the bracket 652 may be longitudinally adjusted relative to the extension 651 of the solenoid plunger and relative to the wire 654. A tension spring 656 is connected between the bracket 652 and the housing of the solenoid 643, and the spring 656 normally urges the bracket 652, the plunger 651, and the wire 654 longitudinally in the upstream direction. Thus, energization of the winding of the solenoid 643 causes movement in the downstream direction of the plunger 647 and the wire 654, and upon deenergization of the solenoid winding, the tension spring 656 returns the plunger 647 and the wire 654 to their unactuated or upstream positions. The wire 654 of the flexible cable may be connected, for example, to actuate a hook inserter assembly, and may thus form part of the flexible cable 548 shown in FIG. 5. Such a hook inserter assembly is preferably located downstream from a hook release station which is actuated by the lift arm 648 and the solenoid 643. In such a system, energization of the solenoid 643 simultaneously lifts a vertically movable bridging member at a hook release station, as described with regard to FIGS. 9 and 10, so that a hanger may be pushed by the forks through the opening of the hook release station, and simultaneously, the flexible cable 653 connected to a downstream hook inserter assembly inserts a hanger on the rail structure downstream from the hook release station. Therefore, the same pusher fork that pushes a hanger through the opening of a hook release station can later pick up another hanger at the downstream hook inserter assembly.

With reference again to FIGS. 9 and 10, while the hook release assembly is shown as taking hangers off toward the left when looking in the downstream direction, it should be understood that similar apparatus may be located at the right of the rail structure. In such an assembly, of course, the hinge portion 632 of the member 613 must be bent to cause the takeoff arm 631 to normally fall to the right rather than towards the left.

The foregoing description has dealt with a system employing endless chains, wheeled carriages fastened to the endless chains, and pusher forks formed on the wheeled carriages. In the construction shown in FIGS. 13, 14, 15 and 16 the system is designed to utilize a roller type chain wherein selected links of the chain have integral extended portions which form pusher forks. The constructions to be described may be used in any of the systems shown in FIGS. 1 to 3A of the drawings but they are particularly useful because of their compactness, in a system such as that shown in FIG. 2.

Figures 13, 14:
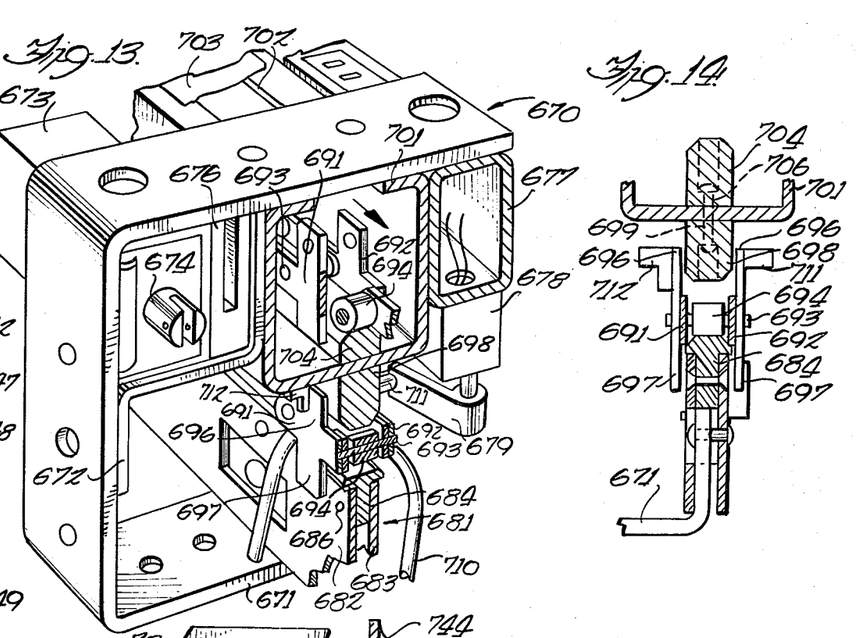
FIG. 13 is a fragmentary perspective view of a modified type of conveyor system.
FIG. 14 is a fragmentary enlarged vertical sectional view of the structure shown in FIG. 13.

The structure shown in FIG. 13 comprises a frame 670 including a standard angle 671 and a closure angle 672, similar to the corresponding members previously described. Located between the closure angle 672 and the adjacent corner of the standard angle 671 are a solenoid 673 having a longitudinally movable plunger 674 and a slide bar support 676. On the opposite side of the standard angle 671 may be provided a hollow conduit 677 which is generally rectangular in cross section and which may house electrical conductors used in the system. Fastened to the under side of the conduit 677 in this instance is a switch 678 having a pivotally mounted switch actuating arm 679 positioned to be engaged and actuated by a finger 711 (FIG. 14) of a pusher fork.

The frame 670 further supports a rail structure 681 comprising a pair of parallel, longitudinally extending rails 682 and 683 which are spaced apart and secured to the standard angle 671 in the manner previously described. A T-shaped rail insert 684 is preferably included in the rail structure 681, the cross or horizontal portion of the T overlying the upper edges of the rails 682 and 683, and the vertical portion of the T extending downwardly between the two rails 682 and 683. The rail insert 684 may be made of nylon, for example, and may be secured to the two rails by means of rivets 686.

The endless chain comprises two parallel rows of links 691 and 692 (FIGS. 13 and 14), the links of each row being positioned in longitudinal alignment and being pivotally connected by means of pins 693. The pins 693 also serve to connect the two rows of links together, and a roller 694 is rotatably mounted on each pin 693. At spaced intervals along the track, laterally adjacent pairs of links have portions which extend upwardly and downwardly from the central or main body of the links and form upper and lower pusher forks 696 and 697, respectively. The lower forks 697 straddle the nylon insert 684 and the vertical sides of the rail structure 681, and the upper forks 696 extend upwardly adjacent the vertical sides of a guide 698 (FIG. 14) which, for example, may also be made of nylon. The guide 698 is secured as by means of screws 699 to the underside of a generally square channel 701 which is supported by the frame 670. The channel 701 has a longitudinally extending opening 702 on its top side which may be covered with a strip of tape 703 to prevent dirt from entering the interior of the channel. Within the channel 701 above the guide 698 is mounted another guide 704 which may be fastened to the channel 701 by means of screws 706 (FIG. 14). Thus, the lower section of the chain, which is the portion that pushes the hangers along the rail structure 681, is supported by the rail insert 684 while the return section of the chain rests on and is supported by the upper surface of the guide 704. The guide 698 prevents lateral movement of the chain relative to the rail structure 681 and it also prevents tilting movement of the chain relative to the rail structure. Still further, the guide 698 prevents excessive rise of portions of the chain due, for example, to the chain tending to move upwardly as it moves forks along the rail structure 681.

As shown in FIG. 13, a hanger 710 being moved along the rail structure 681 is positioned on top of the rail insert 684 between the upper surface of the rail insert and the underside of the chain. The rail insert thus serves as a support for both the hanger 710 and the chain. The frictional drag of the hanger 710 on the rail insert 684 causes the links having the forks 696 and 697 formed thereon to tilt upwardly and rearwardly so that the roller 694 at the upstream end of these links rises slightly but the amount of the rise is limited by the guide member 698.

The forks 696 and 697 may have fingers or pins secured thereto for the purpose of actuating switches or trip mechanisms as previously explained. For example, the pin 711 is formed on the upper pusher fork 696 and extends toward the right, when looking in the downstream direction, in a position to actuate the switch arm 679 (FIG. 13). In addition, fingers 712 may be fastened to the upper pusher forks 696 on the left, when looking in the downstream direction, in position to engage and actuate other trip mechanisms or switches.

Figure 15:
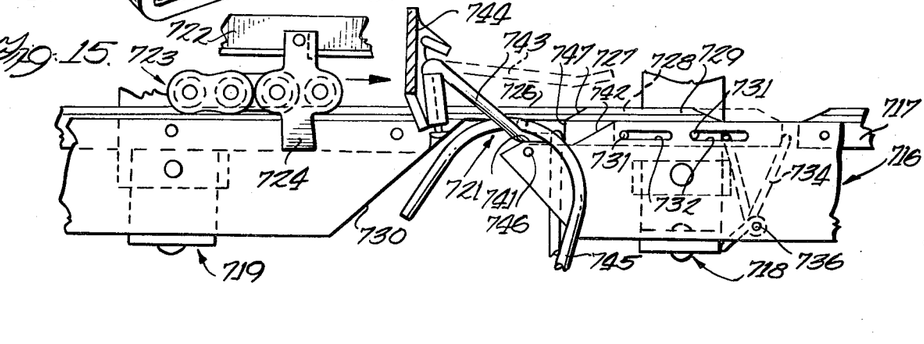
FIGS. 15 and 16 are fragmentary elevational views of a modification of the structure of FIGS. 13 and 14.

Since the chain in FIGS. 13 and 14 is designed to ride along the upper edge of the rail structure, it is not possible to insert a hanger directly onto the upper surface of the rail structure by means of the hook insertion assembly shown in FIG. 5, but the modified rail structure shown in FIG. 15 may be used with the hook insertion means of FIG. 5.

The construction shown in FIG. 15 comprises a rail structure 716 including a pair of parallel rails and a rail insert 717 positioned between and at the upper edges of rails. The rail structure 716 is supported by frames 718 and 719, only portions of which are shown in FIG. 15, and an opening or gap, indicated generally by the numeral 721, is formed in the rail structure 716. Positioned above the upper edge of the rail structure 716 is a guide 722, which is generally similar to the guide 698 of FIGS. 13 and 14 as previously described, and an endless roller chain 723 having pusher forks 724 formed integrally on the chain links at spaced intervals is positioned on the rail structure 716. As previously described, the pusher forks 724 extend along the vertical sides of the rail structure 716 and the guide 722, and the rail structure and the guide cooperate with the forks 724 to prevent the chain 723 from sliding sidewise or tilting relative to the rail structure 716.

The construction shown in FIG. 15 assumes movement of the chain 723 and the pusher forks 724 fastened thereto from left to right as seen in FIG. 15. The portion of the rail insert 717 on the upstream side of the opening 721 includes an extension 726 which extends substantially over the opening 721 and terminates at the point indicated by the numeral 727. The vertical leg of the T-shaped rail insert 717 is cut away from the extension 726 from the point 727 upstream to the upstream side of the opening 721, and the end edges 730 of the rails of the structure 716 at the upstream side of the opening 721 are tapered downwardly and upstream. An opening formed in the rail insert 717 extends from the point 727 to the point indicated by the numeral 728 at the downstream side of the opening 721. Between the two points 727 and 728 is positioned a slide bar 729 which is slidably or reciprocably mounted on the rail structure 716 for movement in the longitudinal direction. The slide bar 729 has laterally extending pins 731 secured thereto, the pins 731 preferably extending laterally in both directions from the slide bar 729, and the pins 731 being positioned within longitudinally elongated slots 732 formed in the rails of the rail structure 716 adjacent the upper edges of the rails.

By this arrangement, the slide bar 729 is permitted to move longitudinally an amount which is determined by the longitudinal length of the slots 732.

The slide bar 729 has two positions, namely, an unactuated position shown in full lines in FIG. 15 and an actuated position shown in dashed lines in FIG. 15. In the unactuated position the upstream end of the slide bar 729 abuts the rail insert extension 726 at the point 727, and in the actuated position the upstream end of the slide bar 729 is spaced from the point 727, as indicated by the numeral 728. In both the actuated and the unactuated positions of the slide bar 729, the downstream end of the slide bar 729 is spaced from the point 728, as shown in FIG. 15. The slide bar 729 is normally urged to the unactuated position by a torsion spring 734 which is mounted on a pin 736 secured to the rail structure 716. One end of the torsion spring 734 is anchored on the frame 718 and the other end of the spring 734 engages the downstream end of the slide bar 729, and the tension on the torsion spring 734 is such that the spring urges the slide bar 729 longitudinally in the upstream direction.

The portion of the rail structure 716 at the downstream edge of the opening 721 and underneath the extension 726 is recessed to form a ledge 741 which is spaced below the upper surface of the rail structure 716. At the downstream side of the ledge 741, the rail structure 716 is inclined upwardly as at 742, to the point 728 at the upper edge of the rail structure 716. Thus, when the slide bar 729 is in the actuated or downstream position, a hanger positioned on the ledge 741 may be moved in the downstream direction and pushed upwardly along the inclined portion 742 through the gap formed between the two points 727 and 728 and onto the upper surface of the slide bar 729.

A hanger may be positioned on the ledge 741 by means of apparatus of the type shown in FIG. 5. In FIG. 15 a portion of the hook insertion assembly is shown, including a pivotal arm 743 that is swingably mounted on a support 744. The members 743 and 744 correspond in construction to that of the members 528 and 527, respectively, as shown in FIG. 5. The principal difference is that the lower end of the rod 743, when in its normal downward position, rests on a pin 746 at the ledge 741, whereas the lower end of the arm 528 shown in FIG. 5 rests on a stop 493 which is at the upper level of the rail structure. Thus, the hook insertion apparatus shown in FIG. 15 is designed to deposit hangers on the ledge 741 below the upper edge of the rail structure 716, whereas the hook insertion apparatus shown in FIG. 5 is designed to insert hangers on the upper edge of the rail structure. The hinge mounting of the arm 743 on the support 744 also permits the arm 743 to swing upwardly to the dashed line position shown in FIG. 15 when a hanger and pusher fork pass by.

In operation, a hanger 745 is deposited by the hook insertion apparatus prior to the arrival of the pusher forks 724. A hanger so inserted slides down the support 744 and the arm 743 and comes to rest on the ledge 741. Subsequently, the pusher forks 724 engage the hanger 745 on the ledge 741 and move the hanger toward the right. Initial downstream movement of the hanger causes it to engage the vertical upstream end edge 747 of the slide bar 729 and push the latter in the downstream direction against the force of the torsion spring 734, thereby opening the gap between the points 727 and 728. Continued downstream movement of the pusher forks 724 push the hanger upwardly along the inclined portion 742 and onto the upper surface of the slide bar 729. Once the hanger has reached the upper surface of the slide bar 729, the torsion spring 734 is able to return the slide bar 729 to its normal unactuated position, and the pusher forks 724 continue to push the hanger along the surface of the slide bar 729. Eventually, the hanger slides off the downstream end of the slide bar 729 and on to the upper edges of the rails, and subsequently the hanger is pushed on to the upper surface of the rail insert 717. Thereafter the movement of the hanger continues until the hanger reaches the proper disbursing station, as hereinafter described in connection with FIG. 16.

Figure 16:
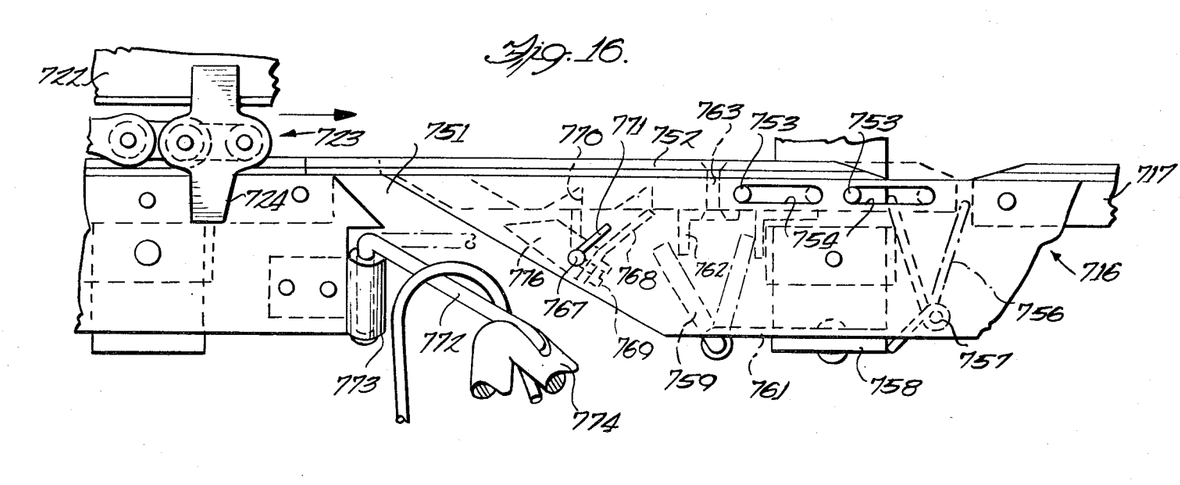

The hanger release construction shown in FIG. 16 may be considered a continuation of the structure shown in FIG. 15, and, therefore, the same reference numerals are used for corresponding parts. The rail structure 716 has another opening or gap 751 formed therein which is normally bridged by a slide bar 752. The bar 752 is mounted between the twin rails of the rail structure 716, the rail insert 717 in the vicinity of the bar 752, of course, being eliminated. A plurality of laterally extending pins 753 are formed on the vertical sides of the slide bar 752, and the pins 753 extend into longitudinally elongated slots 754 formed in the twin rails adjacent the upper edges thereof. Thus, the slide bar 752 is capable of movement between an upstream or unactuated position wherein the pins 753 are at the upstream ends of the slots 754 and a downstream or actuated position wherein the pins 753 are adjacent the downstream ends of the slots 754. At the downstream end of the slide bar 752, a torsion spring 756 is mounted on a laterally extending pin 757 attached to the rail structure 716. One end of the spring 756 is anchored on a frame 758 of the assembly, and the other end of the spring 756 engages the downstream end of the slide bar 752. The tension on the spring 756 is such that the spring 756 normally urges the slide bar 752 longitudinally in the upstream direction to close the gap 751.

To open the gap 751 by moving the slide bar 752 downstream against the force of the spring 756, a slide bar actuating arm 759 is provided which is similar to the lift arm 616 shown in FIG. 9. The arm 759 is pivotably mounted on a hinge support member 761 which in turn is supported by the frame 758, and a generally vertically extending portion of the actuating arm 759 extends upwardly between the twin rails of the rail structure 716, the upper end of the arm 759 terminating just below the lower surface of the slide bar 752. An angle 762 is secured to the bar 752 by means of a rivet or screw 763, the angle 762 having a downwardly extending arm which is positioned to be engaged by the actuating arm 759 upon pivotal movement of the arm 759 in the clockwise direction as seen in FIG. 16. Such pivotal movement of the arm 759 causes it to engage the downwardly extending arm of the angle 762 and push it and the slide bar 752 in the downstream direction against the force of the torsion spring 756.

Pivotal movement of the actuating arm 759 may be obtained by means of the structure including the slide bar 622' and the bracket 621 shown in FIG. 9, movement of the slide bar 622 being obtained as previously described with regard to the operation shown in FIG. 9.

If it is desired to hold the slide bar 752 in the actuated position for a short period of time, a delay device may be provided also. The delay device comprises a member 766 which is pivotally mounted on a laterally extending axis by means of a pin 767, the pin 767 being mounted on the rail structure 716 and the member 766 being positioned between the twin rails and underneath the slide bar 752. The weight distribution of the member 766 is such that the greatest proportion of its weight is toward the left of the pin 767, as viewed in FIG. 16, with the result that the member 766 and the pin 767 tend to pivot in the counterclockwise direction as seen in FIG. 16. A leaf 768 is secured by means of a set screw 769 to the downstream end of the member 766. From the member 766, the leaf 768 extends upwardly and its upper edge is in sliding engagement with the underside of the slide bar 752. A notch 770 is formed in the underside of the bar 752, and the notch 770 is located such that the upper end of the leaf 768 may extend upwardly and catch in the notch 770 upon movement of the slide bar 752 in a downstream direction to the actuated position. When the leaf 768 extends into the notch 770, the slide bar 752 is prevented from returning to the upstream or unactuated position.

To close the gap 751 after actuation of the slide bar 752, an arm 771 is secured to the outer end of the pin 767, on the outside of the rail structure 716. The arm 771 extends upwardly when the leaf 768 is in the notch 770. Therefore, after the pusher fork 724 has passed the gap 751, it engages the arm 771 and pivots the pin 767 and the member 766 secured thereto in the clockwise direction as seen in FIG. 16. Such pivotal movement causes the leaf 768 to swing downstream and downwardly out of the notch 770, after which the torsion spring 756 returns the slide bar 752 to the downstream position. After the pusher fork 724 passes the arm 771, the weight distribution of the member 766 tends to pivot the pin 767 and the leaf 768 in the counterclockwise direction, and the upper edge of the leaf 768 again engages the underside of the slide 752.

Hangers dropping through the gap 751 from the rail structure fall on a pivotal arm 772 which is swingably mounted on a hinge bracket 773, the bracket 773 in turn being secured to the rail structure 716 at the upstream side of the gap 751. The hinge axis of the arm 772 is slanted in the manner previously described with regard to the operation of the arm 631 shown in FIG. 9, and in its normal position the lower or downstream end of the arm 772 may rest on a rod 774 which is generally similar to the rod 634 shown in FIG. 9. However, a pivot stop may be provided on the hinge bracket 773 to limit the position of the arm 772 without seating engagement with the rod 774, as heretofore explained in connection with FIG. 9. The hinge mounting of the arm 772 also permits the arm 772 to be pivoted to a generally longitudinal position when it is engaged by a hanger and pusher forks moving in the downstream direction.

In operation, assume that the chain 723 and the pusher forks 724 are moving in the downstream direction (to the right as viewed in FIG. 16) and pushing a hanger along the upper surface of the rail insert 717 of the rail structure 716. Prior to the arrival of the hanger and pusher forks 724 at the gap 751, the slide bar actuating arm 759 is actuated, in the manner described with regard to FIG. 9 so that the slide bar 752 is moved downstream to the actuated position. As soon as the movement of the slide bar 752 is sufficient for the notch 770 to pass the leaf 768, the weight distribution of the member 766 causes pivotal movement of the leaf 768 into the notch 770 to hold slide bar 752 in the actuated position with the gap 751 open. Thereafter, continued movement of the hanger and the pusher forks 724 in the downstream direction causes the hanger to drop through the gap 751 and onto the pivotal arm 772 which is sloped to cause the hanger to slide downwardly onto the rod 774 where it continues to slide to, for example, a storage position. Thereafter, continued downstream movement of the pusher forks 724 causes the lower end of one of the pusher forks 724 to engage the upper end of the release arm 771 and pivot the pin 767 and the leaf 768 in the clockwise direction sufficiently far for the leaf 768 to become disengaged from the notch 770, thereby permitting spring return of the slide bar 752 to its unactuated position wherein the gap 751 is closed.

In the event a pusher fork pushes a hanger along the rail structure 716 and the slide bar 752 has not been moved to the actuated position, the hanger is pushed over the upper surface of the slide bar 752 and does not fall through the gap 751. The hanger moving past the gap 751 swings the arm 772 to the generally longitudinal position as previously described and as shown in dashed lines in FIG. 16. Movement of the hanger continues in the downstream direction until it arrives at the disbursing station to which it has been designated. To accommodate reverse operation of the conveyor, if desired, the arm 772 may be spring loaded to hold it normally in the dashed line position, in the manner previously described in connection with FIG. 8.

If desired, the longitudinal ends of the slide bar 752 and the adjacent ends of the rail inserts 717 may be slotted or dovetailed so that depressions or sharp edges do not exist at the junctions of the slide bar 752 with the rail inserts 717.

I claim:

1. In an article transporting system, the combination of: at least one elongated overhead conveyor unit comprising means for transporting, longitudinally of the conveyor unit, articles suspended from hooks or the like; means movably supporting said conveyor unit for bodily movement of the conveyor unit in at least one direction between a plurality of spaced locations; and means at each of said locations defining a plurality of article transfer stations, said stations being disposed at spaced intervals along the length of the conveyor unit when the latter is in stationary position at any one of said locations for transferring articles between said conveyor unit and said plurality of transfer stations when said conveyor unit is in said stationary position.

2. The system of claim 1 further characterized in that said conveyor unit is supported for vertical movement between vertically spaced tiers of article transfer stations.

3. The system of claim 1 further characterized in that said conveyor unit is supported for horizontal movement between horizontally spaced groups of article transfer stations.

4. The system of claim 1 further characterized in that said conveyor unit is supported for both vertical and horizontal movement between horizontally spaced stacks of vertically spaced tiers of article transfer stations.

5. The system of claim 4 further characterized in that the tiers of at least one of said stacks contains both article insertion and article removal stations.

6. The system of claim 1 further characterized in that said conveyor unit comprises an elongated support rail and moving pusher means disposed adjacent said rail for engaging and pushing articles therealong.

7. The system of claim 6 further characterized in that said transfer stations in at least one of said locations include a plurality of means spaced along said support rail for inserting articles onto said support rail and a plurality of means spaced along said support rail for removing articles from said support rail.

8. The system of claim 6 further characterized in that said support rail has at least one gap formed therein, a switch is connected to said support rail, said switch having a first position wherein said switch bridges said gap and a second position wherein said switch opens said gap, and means is provided for inserting articles onto said support rail from one side of said support rail at a transfer station positioned adjacent said gap, said means including a downwardly inclined rail having a lower end spaced from one side of said support rail, and an arm pivotally supported adjacent said support rail and the lower end of said inclined rail, said arm having a first position wherein it bridges the space between the lower end of said inclined rail and said support rail and a second position wherein said space is open, whereby articles positioned on said inclined rail are adapted to slide down said inclined rail, onto said arm, and then onto said support rail when said arm is in its first position and said switch is in its second position.

9. The system of claim 8 further characterized in that said inclined rail and said arm are supported on said conveyor unit, and said inclined rail is adapted to be aligned at its upper end with a fixed storage rail at said transfer station.

10. The system of claim 6 further characterized in that said support rail has at least one gap formed therein, a switch is connected to said support rail, said switch having a first position wherein said switch bridges said gap and a second position wherein said switch opens said gap, and means is provided for removing articles from said support rail at a transfer station positioned adjacent said gap at one side of said support rail, said means comprising a receiving rail extending outwardly from said support rail adjacent said gap for receiving articles moved along said support rail into said gap.

11. The system of claim 10 further characterized in that said receiving rail is supported on said conveyor unit and is adapted to be aligned with a fixed storage rail at said transfer station.

12. The system of claim 10 further characterized in that said receiving rail has an inner end spaced from said support rail, and an arm is pivotally supported adjacent said support rail and the inner end of said receiving rail, said arm having a first position wherein it bridges the space between the inner end of said receiving rail and said support rail and a second position wherein said space is open, whereby articles moved from said support rail into said gap slide along said arm onto said receiving rail when said arm is in its first position and said switch is in its second position.

13. The system of claim 12 further characterized in that said receiving rail and said arm are supported on said conveyor unit, and said receiving rail is adapted to be aligned at its opposite end with a fixed storage rail at said transfer station.

14. An article transporting system comprising an elongated support, moving pusher means disposed adjacent said support for engaging and pushing articles therealong, means defining a plurality of article transfer stations at selected locations along said support for inserting articles thereon and discharging articles therefrom, bracket means having said support and said pusher means mounted as a unit thereon, rollers mounted on said bracket means for movably supporting said unit, and a plurality of interconnected vertical and horizontal channels receiving said rollers, whereby said unit is adapted to be horizontally and vertically positioned in said channels for cooperation with selected stations of a plurality of article insertion and article removal stations disposed at different horizontal and vertical locations.

15. In an article transporting system, the combination of: an elongated overhead conveyor unit comprising an elongated support rail structure adapted to support articles suspended from hooks or the like, moving pusher means disposed adjacent said rail structure for engaging and pushing the article-supporting hooks along said rail structure, and drive means for moving said pusher means; stationary support structure; and support means connecting said conveyor unit to said support structure and movably supporting said conveyor unit for bodily movement in at least one direction between a plurality of spaced locations relative to said support structure.

16. The structure of claim 15 further characterized in that said support means includes a plurality of cross-supports secured to and extending transversely of said elongated conveyor unit, and said stationary support structure includes a plurality of stationary upright members cooperating with the opposite ends of said cross-supports for supporting said conveyor unit for vertical movement.

17. The structure of claim 15 further characterized in that said stationary support structure includes a plurality of horizontally disposed roller supports, and said support means includes a plurality of roller means movable along said roller supports and having said conveyor unit suspended therefrom.

18. The structure of claim 17 further characterized in that said roller means have swivel connections with said conveyor unit.

19. The structure of claim 15 further characterized in that said conveyor unit includes a plurality of brackets interconnecting said rail structure and said pusher means, said support means includes rollers mounted on said brackets, and said stationary support structure includes fixed guide channels receiving said rollers.

20. The structure of claim 19 further characterized by the provision of a plurality of guide channels extending in both horizontal and vertical directions.

21. In an article transporting system, the combination of: a conveyor including a longitudinally extending support rail adapted to have articles moved therealong, said rail having a gap formed therein; a switch connected to said support rail and having a first position wherein said switch bridges said gap and a second position wherein said switch opens said gap; and means for inserting articles onto said support rail from one side of said support rail, said means including a downwardly inclined rail having a lower end spaced from one side of said support rail, and an arm pivotally supported adjacent said support rail and the lower end of said inclined rail, said arm having a first position wherein it bridges the space between the lower end of said inclined rail and said support rail and a second position wherein said space is open, whereby articles positioned on said inclined rail are adapted to slide down said inclined rail, onto said arm, and then onto said support rail when said arm is in its first position and said switch is in its second position.

22. The structure of claim 21 further characterized in that said arm when in its first position extends between said inclined rail and said support rail adjacent the downstream side of said gap, and said switch when in its second position opens said gap at the downstream side thereof, whereby to permit sliding movement of an article comprising a hook or the like from said inclined rail and said arm onto said support rail.

23. The structure of claim 21 wherein said support rail has a ledge formed thereon at one side of said gap, said ledge being below the upper level of said support rail, and said arm being cooperable with said ledge for depositing articles thereon.

24. The structure of claim 21 wherein said arm is cooperable with the upper surface of said support rail for depositing articles thereon.

25. The structure of claim 21 wherein said switch comprises a member pivotally connected to said support rail at one side of said gap.

26. The structure of claim 21 wherein said switch comprises a member reciprocably mounted on said support rail at one side of said gap for shifting movement longitudinally of said support rail.

27. The structure of claim 21 wherein said arm is provided with spring means for normally retaining said arm in its second position.

28. The structure of claim 21 wherein said arm is pivotally connected to the lower end of said inclined rail.

29. In an article transporting system including a conveyor having a longitudinally extending support rail adapted to have articles moved therealong, said support rail having a gap formed therein, and means comprising a receiving rail extending outwardly from said support rail adjacent said gap for removing articles from said support rail through said gap, the improvement comprising a rail switch on said support rail having a first position wherein it closes the gap and a second position wherein it opens said gap, said rail switch being slidably mounted on said support rail and being movable longitudinally relative to said support rail, and biasing means engaging said switch and normally urging said switch to said first position where it closes said gap.

30. The structure of claim 29 further including retainer means for releasably holding said switch in said second position, whereby said gap is adapted to be kept open for a predetermined time.

31. The structure of claim 30 further characterized in that said conveyor includes moving pusher means disposed adjacent said support rail for engaging and pushing articles therealong, and release means is provided which is responsive to movement of said pusher means for releasing said retainer means.

32. In an article transporting system including a conveyor having a longitudinally extending support rail adapted to have articles moved therealong, said support rail having a gap formed therein, and means comprising a receiving rail extending outwardly from said support rail adjacent said gap for removing articles from said support rail through said gap, the improvement comprising a rail switch on said support rail having a first position wherein it closes the gap and a second position wherein it opens said gap, said switch being mounted on said support rail for vertical movement relative to said support rail, said switch being parallel to but spaced above the upper level of said support rail when in said first position and being at the level of said support rail when in said second position.

33. The structure of claim 32 further including retainer means for releasably holding said switch in said second position, whereby said gap is adapted to be kept open for a predetermined time.

34. The structure of claim 33 further characterized in that said conveyor includes moving pusher means disposed adjacent said support rail for engaging and pushing articles therealong, and release means is provided which is responsive to movement of said pusher means for releasing said retainer means.

35. In an article transporting system including a conveyor having a longitudinally extending support rail adapted to have articles moved therealong, said support rail having a gap formed therein, and means comprising a receiving rail extending outwardly from said support rail adjacent said gap for removing articles from said support rail through said gap, the improvement comprising a rail switch on said support rail having a first position wherein it closes the gap and a second position wherein it opens said gap, and retainer means for releasably holding said switch in said second position, whereby said gap is adapted to be kept open for a predetermined time.

36. The structure of claim 27 further characterized in that said conveyor includes moving pusher means disposed adjacent said support rail for engaging and pushing articles therealong, and release means is provided which is responsive to movement of said pusher means for releasing said retainer means.

References Cited

UNITED STATES PATENTS 1,220,338    3/1917    Humphery _____ 198—174 X

FOREIGN PATENTS 338,810    12/1958    Switzerland.

EDWARD SROKA, Primary Examiner

U.S. Cl. X.R.

198—174